Patented July 4, 1950

2,513,924

UNITED STATES PATENT OFFICE 2,513,924

CHLOROMETHYL SILICON COMPOUNDS

John R. Elliott and Robert H. Krieble, Schenectady, N. Y., assignors to General Electric Company, a corporation of New York No Drawing. Application May 5, 1945, Serial No. 592,290

7 Claims. (Cl. 260—448.2)

This invention relates to new and useful compounds comprising one or more silicon atoms and at least one monochloromethyl group attached directly to a silicon atom. It is particularly concerned with monochloromethylchlorosilanes and the hydrolysis products obtained therefrom in which all or part of the silicon-bonded hydrocarbon radicals are monochloromethyl groups.

The present invention is based on the discovery that the methyl-substituted silanes and polysiloxanes containing only one chlorine attached to any given methyl radical are stable products under non-alkaline conditions as compared with the more highly chlorinated methylsilanes and polysiloxanes which are described and claimed in the copending application of William F. Gilliam, Serial No. 592,289, now U. S. Patent No. 2,474,578, filed concurrently herewith and assigned to the same assignee as the present invention. For example, whereas the di- and trichloromethyl polysiloxanes described in the Gilliam application continue to condense on heating with cleavage of the C—Cl or Si—C bonds, the C—Cl and Si—C bonds of the compounds of the present invention are not readily broken under such conditions.

Various methods may be employed in preparing the chlorinated methyl silanes and polysiloxanes of the present invention, and the choice of method is made largely on the basis of the particular product or products desired and the number of monochloromethyl groups desired in the product. The chloromethylsilanes can be prepared, for example, by reacting chlorine with the desired methylchlorosilane at a low temperature while employing ultraviolet radiations to promote the reaction. The polysiloxanes can be prepared by hydrolysis of these mono-chloro derivatives, such as dimethyl(chloromethyl)chlorosilane and methyl(chloromethyl)dichlorosilane, or by co-hydrolysis of one or more of these compounds with a methylhalogenosilane, such as methyltrichlorosilane, dimethyldichlorosilane and trimethylchlorosilane, so selected and taken in such proportions that the hydrolysis product will have the required average ratio of methyl and chloromethyl radicals to silicon atoms. Alternatively the monochloromethyl polysiloxanes may be prepared by chlorinating simple polysiloxanes and by employing the products of such chlorination in the preparation of the more complex polymers. In general, relatively few chlorine atoms can be introduced by the latter method since for best yields of stable products only one chlorine atom can be introduced into any given molecule by this method. Any attempt to chlorinate more than one methyl group of a methyl chlorosilane or polysiloxane, particularly at elevated temperatures, generally results in a further chlorination of the first chloromethyl radical.

In order that those skilled in the art better may understand how the present invention may be carried into effect, the following illustrative examples are given:

Example 1

This example illustrates the preparation of methyl(monochloromethyl)chlorosilanes and organo-polysiloxanes containing chloromethyl radicals by hydrolysis of such silanes.

Methyl(chloromethyl)dichlorosilane was prepared as follows:

Ten mols (1290 g.) of dimethyldichlorosilane was placed in a 2-liter, 3-necked flask provided with a source of ultraviolet radiations, a gas inlet tube, a mechanical agitator, a thermometer, and a dry-ice cooled reflux condenser, the outlet of which was connected to a water scrubber. After sweeping the apparatus for ten minutes with nitrogen, chlorine was introduced in a rapid stream through the inlet tube and HCl gas was evolved. The flask was externally cooled in an ice bath and the temperature of the reactants maintained at 20-40° C. When the scrubber had absorbed 320 g. (8.8 mols) of HCl the addition of chlorine was stopped. The product weighed 1598 g., an increase in weight of 308 g., equivalent to the substitution of 8.7 gram atoms of chlorine. The product was fractionally distilled in a column of about 20 theoretical plates. A fraction was obtained at 122° which was re-distilled in a column of about 15 theoretical plates to obtain a distillate at 121.3° C. The distillate was found to contain 43.39 per cent hydrolyzable chlorine and 65.19 per cent total chlorine and was identified as being methyl(chloromethyl)dichlorsilane, $CH_3(CH_2Cl)SiCl_2$.

Hydrolysis of this product by addition thereof to an excess of water produced a stable chlorinated methylpolysiloxane.

Example 2

Example 1 was repeated substituting trimethylchlorosilane for the dimethyldichlorosilane. When 10.56 mols of HCl had been absorbed by the scrubber the reaction was stopped and the reaction products distilled to obtain a fraction between 115 and 115.6 deg. C. This product, which was found to contain 24.77 per cent hydrolyzable chlorine and 48.55 per cent total chlorine, was identified as dimethyl(chloromethyl)chlorosilane, (CH₃)₂CH₂ClSiCl. Hydrolysis of this product yielded an oily tetramethyl-1,3-di(chloromethyl)disiloxane, (CH₂Cl)(CH₃)₂SiOSi(CH₃)₂(CH₂Cl)

boiling at 204.5° C.

113.0 g. (.792 mol) of the dimethyl(chloromethyl)chlorosilane and 86.0 g. (.792 mol) of trimethylchlorosilane were mixed and shaken with about 500 cc. of water. After drying over Na₂CO₃, 137.5 g. of a limpid, colorless oil was distilled in a column of about 15 theoretical plates. Thirty grams of hexamethyldisiloxane, B. P. 100.4° C., 49 g. of a material, A, B. P. 151.6–151.8° C., and 20.4 g. of tetramethyl-1,3-di(chloromethyl)disiloxane, B. P. 204–204.5° C., were obtained in the distillation. Material A was found to contain 18.23 per cent chlorine and was identified as being pentamethylchloromethyldisiloxane, (CH₃)₃Si—O—Si(CH₃)₂(CH₂Cl).

*Example 3*

This example is concerned with the preparation of a mono-chlorinated methyl polysiloxane by direct chlorination of a methylpolysiloxane.

One mol (296 g.) of octamethylcyclotetrasiloxane was placed in a 1-liter, 3-necked flask equipped with a gas inlet tube, a mechanical stirrer, a 4-watt germicidal (ultraviolet) lamp, and a gas outlet tube leading to a water scrubber. Dry chlorine was slowly passed into the flask at room temperature. The solution first turned green due to dissolved chlorine but after a few minutes rapid gas evolution occurred and the solution became colorless. After two hours the chlorine was shut off. The scrubber had gained 40 g. in weight, which is equal to 1.10 mols as HCl. The product, which was a limpid, clear, colorless liquid, had gained 38 g. After washing with potassium carbonate solution followed by water, the product was fractionally distilled at 50 mm. pressure in a column of about 15 theoretical plates. Besides unchanged starting material, a constant boiling product was obtained at 123° C. which melted between —0.5° C. and 1° C. The product contained 10.98 per cent chlorine and was identified as being chloromethylheptamethyltetrasiloxane.

One cubic centimeter of this material was dissolved in a mixture of 15 cc. neutral dioxane and 5 cc. of H₂O and refluxed for one hour, after which the solution was found to be still basic to methyl orange indicator, showing that no hydrolysis had occurred. Another sample was refluxed at atmospheric pressure for a day, at the end of which time the boiling point was unchanged and the liquid remainder clear and but faintly yellow. Three cubic centimeter of the material was added to a solution of 1.0 g. of sodium carbonate in 5 cc. water and refluxed for 1½ hours, after which the mixture was acidified with nitric acid and tested for chloride ion by the addition of silver nitrite solution. No precipitate was obtained, thus showing that no C—Cl hydrolysis had occurred. These tests demonstrate the stability of the silicon-bonded CH₂Cl— group.

76.6 g. of the chloromethylheptamethylcyclotetrasiloxane plus 1.5 g. FeCl₃·6H₂O was stirred in a receptacle placed in an oil bath under a nitrogen atmosphere for 3 hours at 122° C. and an additional 2 hours at 140° C. after which a very thick liquid was obtained which on cooling became a somewhat pasty elastic gum suitable for the preparation of silicone rubbers or elastomers. The gum was completely soluble in toluene, indicating that no cross-linking had occurred by HCl splitting, which is confirmed by the fact that no odor of HCl could be detected at any time during the polymerization.

*Example 4*

A chain-stoppered silicone oil containing chloromethyl groups but otherwise comparable with the oily silicones described and claimed in the copending application Serial No. 463,814, filed October 29, 1942, now U. S. Patent 2,469,888 in the name of Winton I. Patnode, was prepared by shaking 25.52 g. of chloromethylheptamethylcyclotetrasiloxane and 1.47 g. of hexamethyl disiloxane with 1 ml. concentrated sulfuric acid for 20 hours, and then adding 5 ml. of water and shaking for an additional two hours. The water was removed by centrifugation and the oil filtered. The oil comprising a mixture of linear polysiloxanes consisting of terminal (CH₃)₃—Si— groups and intermediate.

$$\begin{array}{c} R \\ | \\ -Si- \\ | \\ R' \end{array}$$

groups joined together through oxygen atoms, the $$\begin{array}{c} R \\ | \\ -Si- \\ | \\ R' \end{array}$$

groups, in which R represents a methyl group and R' a methyl or chloromethyl group, being derived from the tetrasiloxane. The oil was a water-white liquid. Its viscosity was 42 C. S./100° F. and 15.8 C. S./210° C. The dielectric constant of the oil was 3.94 at 60 cycles at room temperature and its loss factor was less than 0.2%.

This oil showed increased "oiliness" over the unchlorinated methyl silicone oils when tested by spinning a ball at 15,000 R. P. M. on a flat plate lubricated with the oil, making it particularly useful for various lubricating applications.

While the invention has been particularly described with reference to silanes and polysiloxanes containing silicon-bonded methyl and monochloromethyl groups, it will be obvious to those skilled in the art that other monochloromethyl-substituted silicon compounds may also be prepared without departing from the spirit and scope of the present invention. For example, the silanes of the present invention may be cohydrolyzed and condensed with various alkylhalogenosilanes or arylhalogenosilanes such as diethyldichlorosilane, phenylchlorosilane, etc., to form polysiloxanes containing both monochloromethyl groups and silicon-bonded ethyl radicals, phenyl radicals, etc. Likewise polysiloxane chain compounds similar to those described in Example 4 but containing hydrocarbon substituents other than the methyl radicals can be prepared by substituting polysiloxanes such as hexaethyldisiloxane, hexaphenyldisiloxane or the like for all or parts of the hexamethyldisiloxane.

What we claim as new and desire to secure by Letters Patent of the United States is:

1. Dimethylchloromethylchlorosilane.
2. Methylchloromethyldichlorosilane.
3. A methylchloromethylchlorosilane.
4. The method of preparing methylchloromethyldichlorosilane which comprises effecting reaction between chlorine and dimethyldichlorosilane at 20° to 40° C. while subjecting the reaction mass to ultraviolet radiation, and distilling the resulting product to separate therefrom methylchloromethyldichlorosilane.

5. Pentamethylchloromethyldisiloxane having the formula $(CH_3)_3Si\text{—}O\text{—}Si(CH_3)_2CH_2Cl$.

6. A non-cyclic monochloromethyl silicon composition selected from the group consisting of (1) organochlorosilanes consisting of a single silicon atom, silicon-bonded methyl radicals, and silicon-bonded chloromethyl radicals containing only one chlorine atom attached to the carbon atom of the said chloromethyl radical and silicon-bonded chlorine atoms, and (2) a disiloxane consisting of silicon and oxygen atoms, silicon-bonded methyl radicals and silicon-bonded monochloromethyl radicals, only one chloromethyl radical being connected to any one silicon atom.

7. A disiloxane consisting of silicon and oxygen atoms, silicon-bonded methyl radicals and silicon-bonded monochloromethyl radicals, only one chloromethyl radical being connected to any one silicon atom.

JOHN R. ELLIOTT.
ROBERT H. KRIEBLE.

REFERENCES CITED

The following references are of record in the file of this patent:

UNITED STATES PATENTS

| Number | Name | Date |
|---|---|---|
| 2,258,219 | Rochow | Oct. 7, 1941 |
| 2,258,222 | Rochow | Oct. 7, 1941 |
| 2,384,384 | McGregor | Sept. 4, 1945 |

OTHER REFERENCES

Taylor, "Journal American Chemical Society," vol. 66, pages 842–843 (May 1944).

Ushakov, "Chemical Abstracts," vol. 32, page 2083 (1938).

Beilstein, "Handbuch der Org. Chem.," 4th ed., vol. IV, pages 625 and 629.